United States Patent [19]

Malthouse et al.

[11] 3,832,426
[45] Aug. 27, 1974

[54] SYNTACTIC CARBON FOAM

[75] Inventors: William B. Malthouse, Lenoir City; David R. Masters, Knoxville, both of Tenn.

[73] Assignee: The United States of America as represented by the United States Atomic Energy Commission, Washington, D.C.

[22] Filed: Dec. 19, 1972

[21] Appl. No.: 316,626

[52] U.S. Cl.................. 264/29, 106/56, 264/41, 264/44, 264/DIG. 6
[51] Int. Cl............................................. C01b 31/00
[58] Field of Search............ 264/DIG. 6, 41, 44, 29; 106/56

[56] References Cited
UNITED STATES PATENTS 3,153,636  10/1964  Shanta et al.......................... 264/29
3,175,918  3/1965  McGahan et al..................... 264/29

*Primary Examiner*—Melvyn I. Marquis
*Attorney, Agent, or Firm*—John A. Horan; David S. Zachry; Earl Larcher

[57] ABSTRACT

Syntactic carbon foam comprising hollow carbon microspheres in a carbon matrix is prepared by employing the steps of mixing hollow phenolic resin microspheres with a carbonizable binder consisting of resin and starch particulates, compacting the mixture, gelatinizing the starch in the binder while maintaining the mixture under a load corresponding to a pressure greater than ambient pressure, and then heating the mixture to convert the mixture of spheres and binder to carbon. The use of the resin-starch binder significantly increases the plasticity of the foam during the carbonization step to minimize deleterious internal stressing.

6 Claims, No Drawings

SYNTACTIC CARBON FOAM

The present invention relates to syntactic carbon foam which exhibits improved compressive strengths over previously known syntactic carbon foams at comparable densities, and more particularly to the method of making the improved syntactic carbon foam. This invention was made in the course of, or under, a contract with the United States Atomic Energy Commission.

Carbon foams exhibit desirable thermal insulating characteristics, high strength-to-weight ratios, and are particularly useful at relatively high temperatures, particularly in non-oxidizing atmospheres. Of the various types of carbon foams available syntactic carbon foam is especially suitable for some applications where relatively high compressive strengths at low densities are desired. Syntactic carbon foam is formed of hollow carbon spheres or spheroids bound together in a carbon matrix which is provided by a carbonized resin binder.

The hollow microspheres, i.e., spheres in the micron size range, employed in the syntactic foam may be prepared by employing any suitable known technique. For example, satisfactory hollow microspheres may be produced by mixing a volatile blowing agent with suitable phenolic resin such as phenol-formaldehyde, forming droplets of the mixture, and then heating the droplets to cure the resin and volatilize the blowing agent while the resin is still sufficiently plastic for forming the hollow microspheres. The size and wall thicknesses of the microspheres are primarily controlled by the size of the droplets, viscosity of the resin, and the type of blowing agent. Normally, commercially available microspheres in a size range of about 5 to 300 microns have been satisfactory for use in the preparation of syntactic foam but microspheres of other sizes may be readily employed in the method of the present invention. Also, the resin microspheres may be mixed with the resin binder and then converted to carbon along with the resin or, if desired, the resin microspheres may be carbonized prior to forming the mixture with the resin binder.

While syntactic carbon foam as previously prepared provided satisfactory compressive strengths at relatively low densities it was found that the foam had attendant shortcomings such as an inadequate bond between the microspheres and the carbon matrix and the presence of cracks in the matrix which prevented its preparation with even higher compressive strengths at the same densities. These shortcomings were substantially minimized by preparing syntactic carbon foam in accordance with the method described in assignee's copending U.S. patent application Ser. No. 194,057, filed Oct. 29, 1971, and entitled "Improved Syntactic Foam and Method for Preparing the Same." In practicing the invention in assignee's application hollow resin microspheres are mixed with a carbonizable resin binder, molded and/or cured under pressure loadings of 10–200 psi during molding and 1–10 psi during curing and then, after releasing the pressure, heated to a a temperature adequate to carbonize the microspheres and the binder. The pressing of the mixture during the curing step increased the cross-linking between the resin binder and the resin microspheres and enhanced the venting of entrapped gases so as to effect a significant increase in the compressive strength of the carbonized foam product.

While the method of preparing syntactic foam as described in the aforementioned patent application provided a substantial improvement in the compressive strength over previously known syntactic foams the shrinkage of the spheres and binder during pyrolysis or carbonization induced stresses in the foam which detracted from the compressive strength of the carbonized foam product.

It is a principal objective of the present invention to obviate or substantially minimize the above and other shortcomings by providing a still further improved method for preparing syntactic carbon foam. This goal is accomplished by mixing hollow spheres of a carbonizable resin with water and a particulate binder formed of a carbonizable resin and a water-soluble starch, molding the mixture, heating the molded mixture to gelatinize the starch and drive off excess water, heating the mixture to carbonize the resin spheres and the binder, and subjecting the mixture during at least one of the steps of molding and starch-gelatinization to a load corresponding to a pressure greater than atmospheric or ambient pressure. By practicing the present invention internal stresses, which previously caused considerable problems, are minimal so as to provide syntactic carbon foam having a compressive strength substantially greater than in syntactic carbon foams heretofore available at comparable densities.

Other and further objects of the invention will be obvious upon an understanding of the illustrative method about to be described, or will be indicated in the appended claims, and various advantages not referred to herein will occur to one skilled in the art upon employment of the invention in practice. While the description below is directed to the use of microspheres prepared from phenolic resin it should be clear that such microspheres may be formed of other carbonizable resins such as alkyds, acrylics, indenes, etc., without departing from the spirit and scope of the present invention.

Described generally, the present invention is directed to an improved syntactic carbon foam product or composite and the method of preparing the same. The improved product is characterized by substantial increases in the compressive strength, product size, modulus of elasticity, and in plasticity during carbonization. The method comprises the steps of preparing a mixture of hollow spheres of a carbonizable resin; water; a water-soluble, carbonizable starch in particulate form; and a carbonizable resin also in particulate form; molding the mixture under pressure; heating the mixture while under pressure to gelatinize the starch and effect removal of excess water from the composite; and thereafter releasing the pressure and heating the composite in an inert atmosphere to a temperature adequate to carbonize the resin spheres, the particulate resin, and the stretch. Depending on variables such as density and wall thickness of the resin spheres, sphere size, pressure loading during molding and curing, quantity of binder, the compressive strength of the carbonized foam product ranges from about 1300 psi at a density of 0.260 gm/cc to about 1500 psi at a density of 0.280 gm/cc. The modulus of elasticity of the carbonized foam product ranges from about $852.4 \times 10^3$ psi at the low density to about $1136.6 \times 10^3$ psi at the high density.

Satisfactory syntactic carbon foam has been prepared by using commercially available hollow microspheres of a diameter in the range of about 5 to 300 microns with the best results being achieved by using microspheres in a narrow size or diameter range wherein the microspheres vary in diameter from one another by a maximum of about 50 microns. The use of microspheres in a narrow size range provides a stronger product and uniform density. The wall thickness of the microspheres, which has a direct bearing on the strength and density of the product, is preferably in a range of about 2 to 5 microns. Microspheres of a size larger or smaller with thinner or thicker walls than the aforementioned commercially available size may slo be used in the syntactic foam with satisfactory results.

The binder employed in the preparation of the syntactic carbon foam is a mixture consisting of a water-soluble starch and an organic resin, both in particulate form, with the quantity of binder providing 30 to 40 weight per cent of the microsphere-binder-water mixture. The starch may be any of the naturally occurring plant starches such as cereals, corn, potato, tapioca, etc. with a particle size in the range of about 15 to 50 microns. The binder contains 30 to 70 weight per cent starch since with less than 30 weight per cent the aforementioned internal stresses are not sufficiently minimized to realize the increased compressive strength and the fabrication of larger volume products while with more than 70 weight per cent the bond provided by the carbonized binder is not adequate to achieve the increase in compressive strength or assure the structural integrity of the product. Upon forming the microsphere-water-binder mixture with the particulate binder being uniformly dispersed throughout the mixture, the mixture is molded under a pressure of 10 to 200 psi and then heated, while under pressure, to a temperature adequate to gelatinize the starch and then to a higher temperature, if desired, to thermoset the gelatinized starch and promote cross-linking of the polymer materials, i.e., the resin in the binder and the resin microspheres. The gelatinized starch serves to hold the resin particles and microspheres in place prior to and during carbonization. Satisfactory results have been achieved by using a temperature in the range of about 80° to 100°C. for gelatinizing the starch and a temperature in the range of about 130° to 170°C. to thermoset the gelatinized starch and initiate cross-linking of the polymers. The quantity of water employed in the mixture is preferably no more than that which will promote the pressing of the foam mixture during the molding step and effect the gelatinization of the starch. Excess water, i.e., the quantity of water greater than necessary for gelatinizing the starch, is driven off during the aforementioned heating step under pressure by employing a conventional venting mechanism in the pressing mechanism.

The particulate resin binder may be of any suitable high-carbon yielding organic resins such as epoxies; aldehydes; partially or fully polymerized alcohols; pitches of coal tar, vegetable, or petroleum origin; pyrrolidones; polyphenylenes; polyacrylonitrile and copolymers of vinylidene chloride-acrylonitrile; decacyclene; and derivatives of indene. The resin particulates are preferably in a size range of about 100 to 200 mesh (Tyler) but smaller particulates such as those in a range corresponding to that of the starch particles may be satisfactorily employed.

Upon completing the gelatinization of the starch and, if desired, the thermosetting of the starch and the curing of the resins under pressure, the pressure is released and the composite is then carbonized by heating it to a temperature in the range of about 750° to 1100°C. in an inert atmosphere such as argon, helium, nitrogen, etc.

The starch-resin binder system of the present invention introduces sufficient plasticity in the microsphere-binder composite during essentially the entire carbonizing step so as to allow the attendant shrinkage during heating to occur without generating deleterious stresses in the carbonized foam. With previously employed binders the microsphere-binder composite became relatively rigid and non-yielding during the carbonizing step and at a time considerably prior to the conversion of the composite to carbon so that the heat-induced shrinkage of the microspheres and binder caused substantial stresses at the interfaces between the microspheres and the binder.

The mixture of microspheres and binder is preferably both molded and heated to a temperature adequate to at least gelatinize the starch under the influence of pressure loadings. These pressure loadings effect an increase in the compressive strength of the syntactic carbon foam product for reasons set forth above and in the aforementioned patent application. The pressure employed during the molding step is preferably in the range of about 100 to 200 psi while the pressure employed in the starch gelatinizing and polymer curing step is preferably in the range of 10 to 50 psi.

To better illustrate the preparation of syntactic carbon foam in accordance with the present invention an example directed to the preparation of syntactic foam discs is set forth below.

EXAMPLE

Two syntactic foam discs, each having a diameter of 2.6 inches and a thickness of 0.9 inch, were prepared from two mixtures, each containing 60 grams of carbon microspheres (average diameter of 200 microns), 24 grams of phenolic resin having an average size of 150 mesh, 24 grams of tapioca starch particles having an average size of 17 microns, and 100 cc of water. The carbon microspheres, phenolic resin, and tapioca starch were blended and combined with the 100 cc of water to form a mixture in which the microspheres and binder particles were uniformly dispersed. Each mixture was cold pressed in a carbon die at 200 psi to form a molded composite. The pressure in the die was reduced to 50 psi and the composite placed in an oven at 90°C. for 24 hours for gelatinizing the starch. After the curing cycle the pressure was released and the composite was carbonized at 850°C. in an argon atmosphere while still in the die. A 60-hour heat cycle having a temperature increase rate of 15°C. per hour was used to carbonize the discs. The physical properties of the disc are shown below in the table.

TABLE

| Disc No. | Density gm/cm$^3$ | Compressive Strength (psi) | Modulus of Elasticity $\times 10^3$ (psi) |
| --- | --- | --- | --- |
| 1 | 0.265 | 1,385 | 852.4 |
| 2 | 0.280 | 1,455 | 1,136.6 |

The present invention provides a substantially improved syntactic carbon foam which at comparable densities possesses compressive strengths greater by a factor of about 1.5 to 2 over the syntactic carbon foam prepared by practicing the invention in the aforementioned patent application. Further, the greater plasticity provided during the carbonization cycle allows for the manufacture of relatively sound syntactic foam structures as large as 1 foot cubes.

What is claimed is

1. A method of preparing a syntactic carbon foam comprising the steps of mixing hollow spheres of a carbonizable resin in a size range of about 5 to 300 microns with water and a binder consisting of particulate water-soluble starch in a concentration of about 30 to 70 weight per cent of the mixture and a particulate organic resin in a concentration of about 30 to 50 weight per cent of the mixture, molding the mixture, heating the molded mixture to a temperature in the range of about 80° to 100°C. to gelatinize the starch, heating the mixture in an inert atmosphere to a temperature in the range of about 750° to 1100°C. to carbonize the resin spheres and binder, and subjecting the mixture during at least one of the steps of molding and starch gelatinization to a load in the range of about 100 to 200 psi and 10 to 50 psi, respectively.

2. The method of preparing a syntactic carbon foam as claimed in claim 1, wherein the starch is in a particle size range of 15 to 50 microns and is selected from the group of starches consisting of cereals, corn, potato and tapioca, and wherein the resin in the binder is in a particle size range of 100 to 200 mesh and is selected from the group of resins consisting of epoxies; aldehydes; partially or fully polymerized alcohols; pitches of coal tar, vegetable, or petroleum origin; pyrrolidones; polyphenylenes; polyacrylonitrile and copolymers of vinylidene chloride-acrylonitrile; decacyclene; and derivatives of indene.

3. The method of preparing a syntactic carbon foam as claimed in claim 1, wherein the mixture is subjected to said load during both the molding step and the starch gelatinizing step.

4. The method of preparing a syntactic carbon foam as claimed in claim 1, wherein the hollow spheres selected from said size range vary in size from one another a maximum of about 50 microns.

5. A syntactic carbon foam article comprising hollow carbon spheres dispersed in a carbon matrix and characterized by a compressive strength in the range of about 1300 to 1500 psi and a modulus of elasticity in the range of about $850 \times 10^3$ to $1200 \times 10^3$ psi at a density in the range of about 0.26 to 0.28 gm/cc.

6. A composition for the manufacture of syntactic carbon foam consisting of a mixture of hollow spheres of a carbonizable resin in a size range of about 5 to 300 microns, water, and a carbonizable binder in the range of 30 to 50 weight per cent water-soluble starch in a particle size range of 15 to 50 microns and an organic carbonizable resin in a particle size range of 100 to 200 mesh.

* * * * *